United States Patent Office 3,466,372
Patented Sept. 9, 1969

3,466,372
TREATMENT OF INFLAMMATION WITH 4-PHENYL - α - METHYL - PHENYL ACETIC ACID, ITS SALTS, ESTERS OR AMIDE DERIVATIVES
Tsung-Ying Shen, Westfield, and Conrad P. Dorn, Jr., Plainfield, N.J., assignors to Merck & Co., Inc., Rahway, N.J., a corporation of New Jersey
No Drawing. Original application May 7, 1964, Ser. No. 365,790. Divided and this application Apr. 14, 1967, Ser. No. 647,302
Int. Cl. A61k 27/00
U.S. Cl. 424—248
13 Claims

ABSTRACT OF THE DISCLOSURE

A method of treating inflammation by administering to a patient from 1–2,000 mg./day of 4-phenyl-α-methyl-phenyl-acetic acid or its salts, esters or amide derivatives thereof.

---

This is a division of application Ser. No. 365,790, filed May 7, 1964, now abandoned.

This invention relates to a method of treating inflammation, and more particularly, it relates to anti-inflammatory compositions having as their active constituent the compound 4-phenyl-α-methyl-phenylacetic acid, or salts, esters, anhydride or amide derivatives of this acid.

It has been an object of considerable research to provide chemical compounds which have a high degree of anti-inflammatory activity, and which is particular, possess this activity for the treatment of arthritic conditions. It has been a further object of these investigations to provide such pharmaceutical compositions which exhibit a minimum of side effects, and as being non-injurious to the gastro intestinal tract.

Accordingly, it is an object of the present invention to provide a method of treatment of inflammation using an active chemical constituent which possesses a high degree of anti-inflammatory activity.

A more particular object of this invention is to provide a method of treatment of arthritis utilizing a chemical compound which possesses a high degree of anti-inflammatory activity, and which gives rise to a minimum of adverse side effects upon administration.

These and other objects and advantages of the present invention will be made apparent from the following more detailed description of the invention.

In accordance with the foregoing, there is provided a novel method of treatment of inflammation in human patients using 4-phenyl-α-methyl-phenylacetic acid as the active constituent. This compound may be administered in the form of the free acid, or as a salt, ester, amide or anhydride derivative thereof.

The active compound of the invention has the formula:

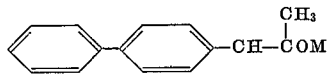

where M is hydroxyl, alkoxy, alkenylkoxy, aroxy aralkoxy, cycloalkoxy and alkeneoxy, including methoxy, ethoxy, n-butoxy, t-butoxy, ethoxyethoxy, phenoxy, benzyloxy, diphenylmethoxy, triphenylmethoxy, cyclopropoxy, β - diethylaminopropoxy, β - dimethylaminoethoxy, phenethoxy, allyloxy, iso-propoxy, β-N-morpholinoethoxy, cyclopropylmethoxy, and tetrahydrofurfuryloxy; amino, secondary and tertiary amino, such as

where R' is alkyl, substituted alkyl such as hydroxyalkyl, polyhydroxyalkyl, dialkylamino alkyl, dialkylamido, carboxyalkyl, cycloalkyl, aryl such as phenyl, alkoxyphenyl, halophenyl, aralkyl such as benzyl, cycloalkyl such as cyclohexyl, and R" may be hydrogen or any of the same radicals as R' and additionally, R' and R" together may be a hetero-ring such as piperidine, piperazine, morpholine, pyrrolidine and the like. The group

may also be part of an amino sugar such as D-glucosamine, D-galactosamine, other hexylamines and pentosamines, theor O-acylated derivatives and glycosides; and OY, where Y is a cation, or

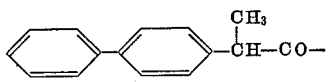

The free acid form of the above compound is particularly useful in the treatment of inflammation. Esters, salts, anhydrides and the amides of such acid also represent simple derivatives of the acid compound which may be utilized herein.

The esters may be obtained by treating the acid with the appropriate alcohol. The preferred esters are the lower alkyl esters, such as the methyl, ethyl, propyl or t-butyl compounds, and the aralkyl esters, such as benzyl, p-halobenzyl and like esters, and the aminoalkyl esters, such as β-diethylaminoethyl, β-piperidinoethyl, β-diethylaminopropyl, and α-piperidinopropyl compounds.

The salts can be obtained by treatment of the free acid with base under mild conditions. In this manner there may be obtained alkaline metal salts such as the sodium and potassium, the aluminum or magnesium salts, or salts of alkaline earth metals, examples of which are barium and calcium.

The amides may be obtained conveniently by treating the acid chloride of the free acid with ammonia or an alkylamine (to form an N-alkylamide).

Among the amines which can be used to form the amides of this invention are alkylamines, such as methylamine, ethylamine, propylamine, butylamine and the like, and dialkylamines such as dimethylamine, diethylamine, methylethylamine, methylbutylamine, dibutylamine and the like. Also usable are hydroxylated alkylamine, such as ethanolamine, diethanolamine, glucosamine, glucosylamine and the like. Among the more complex amines are morpholine, N-methyl-piperazine, piperazine, N-phenyl-piperazine, piperidine, benzylamine, aniline, p-ethoxy-aniline, cyclohexylamine, pyrrolidine, N-hydroxyethylpiperazine, carbobenzyloxymethylamine and the like.

The anhydride may be obtained by treating the acid with dicyclohexylcarbodiamide reagent.

The treatment of inflammation in accordance with the method of the present invention is accomplished by administering the 4-phenyl-α-methyl-phenylacetic acid or derivative thereof in a pharmaceutically acceptable carrier, preferably in tablet or capsule form. The optimum dosage will depend upon the type and severity of the inflammation being treated, and the derivative form of the compound employed. The dose level, of course will depend also upon the reaction sensitivity of the patient. Preferred oral dose levels are in the range 1–2000 mg. per day, suitably with 10–500 mg. per day.

The active compound of course being present in combination with the pharmaceutically acceptable carrier material may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly the carrier of diluent may include a time delay material such as glyceryl monostearate or glyceryl distearate alone or with a wax.

A wide variety of pharmaceutical forms can be employed. Thus, if a solid carrier is used, the preparation can be tableted or placed in a hard gelatin capsule. The amount of solid carrier will vary widely but preferably will be from about 25 mg. to about 1 gm. If a liquid carrier is used, the preparation may be in the form of a soft gelatin capsule, placed in an ampule or in a liquid suspension Since the 4-phenyl-α-methyl-phenylacetic acid compound of the invention possesses an asymmetric carbon atom, it is ordinarily present in the form of a racemic mixture. The resolution of such racemates can be carried out by a vast number of known methods. Thus, some racemic mixtures can be precipitated as eutectics instead of mixed crystals and can thus be quickly separated and in such cases can sometimes be selectively precipitated. The more common method of chemical resolution is, however, greatly preferred. By this method diastereomers are formed from the racemic mixture by reaction with an optically-active resolving agent. Thus, an optically-active base can be reacted with the carboxyl group. The difference in solubility between the diastereomers formed permits the selective crystallization of one form and regeneration of the optically-active acid from the mixture. There is, however, a third method of resolving which shows great promise. This is one or the other forms of biochemical procedures using selective enzymatic reaction. Thus, the racemic acid can be subjected to an asymmetric oxidase or decarboxylase which will, by oxidation or decarboxylation, destroy one form, leaving the other form unchanged. Even more attractive is the use of a hydrolysate on a derivative of the racemic mixture to form preferentially one form of the acid. Thus, esters or amides of the acids can be subjected to an esterase which will selectively saponify one enantiomorph and leave the other unchanged.

When the free acid is resolved into (d) and (l) enantiomorphs, the anti-inflammatory activity is found to reside virtually completely in the (d) isomer. The desired (d) isomer of the free acid may be prepared by any one of the preceding described resolving methods, preferably working from the free acid as the starting material. For example, amide or salt diastereomers of the free acid may be formed with optically-active amines, such as quinine, brucine, cinchonidine, cinchonine, hydroxyhydrindamine, methylamine, morphine, α-phenylethylamine, phenyloxynaphthylmethylamine, quinidine, 1-fenchylamine, strychnine, basic amino acids such as lysine, arginine, amino acid esters, and the like. Similarly ester diastereomers of the free acid may be formed with optically-active alcohols, such as borneol, menthol, 2-octanol and the like. Especially preferred are the use of active α-phenylethylamine, strychnine or quinine to give readily decomposable diastereomer salts which can be fractionally crystallized to separate the two enantiomorphs.

Derivatives of the resolved (d) form of the free acid then may be prepared in the usual way. These derivatives generally are more active than racemates of the same compounds. Consequently, the (d) form of these compounds, substantially free of the (l) form is a still further aspect of this invention.

Example 1.—4-phenyl-α-methyl-phenylacetic acid

A. Ethyl-biphenyl-glyoxalate. — One hundred and eighty-two grams (1.18 moles) of biphenyl and 175 g. of ethyl oxalyl chloride (1.28 moles) is dissolved in 750 cc. of dry carbon disulfide and the solution poured into a 3-liter, 3-necked, round-bottomed flask equipped with a mercury-sealed stirrer and a reflux condenser; a long calcium chloride tube is attached to the latter. One neck of the flask is connected with a 500 cc. Erlenmeyer flask by means of a piece of wide rubber tubing about 8 inches long. The Erlenmeyer flask is supported by a ring stand, neck down, and 173 g. (1.30 moles) of aluminum chloride, which has been placed in the flask is added to the reaction mixture in portions. This is effected with the aid of two pinch clamps which have been attached to the rubber tubing a few centimeters apart. The mixture is heated until it begins to boil, and the aluminum chloride is added at such a rate that the mixture continues to reflux without the aid of external heat. During this operation the mixture is stirred vigorously. A red complex precipitates and continues to increase in amount until the end of the reaction. After complete addition of the aluminum chloride, the mixture is stirred for ten hours. The carbon disulfide solution and the precipitate were treated separately with ice and then combined. The greenish-yellow carbon disulfide layer is separated, washed thoroughly with water, dried and the solvent removed on a steam bath. When the residue is distilled under reduced pressure, there is obtained 15.5 g. of biphenyl and 188.0 g. (70%) of ethyl biphenyl glyoxylate which boils at 205° (5 mm.). The ester is recrystallized from a mixture of ether and petroleum ether (30–60°); M.P. 38–39°.

B. 4-phenyl-α-hydroxy-α-methylphenylacetic acid.—A solution of methyl magnesium iodide is prepared from 4.62 g. of methyl iodide, 0.790 g. of magnesium, and 50 cc. of ether. A solution of 8.27 g. of ethyl-4-biphenyl-glyoxalate in 200 cc. of ether is cooled with an ice-salt mixture and stirred while the solution of the Grignard reagent is added to it dropwise. A yellow complex precipitates immediately. After all the ester has been added, the mixture is kept cold for one hour and then refluxed for three hours. The mixture is poured into dilute sulfuric acid, the ether layer separated and then washed with water. The solvent is removed and the residue, ethyl 4-phenyl-α-hydroxy phenylacetate, is refluxed for one hour with 100 cc. of 10% alcoholic potassium hydroxide. The mixture is poured into 500 cc. of water, stirred and treated with active charcoal and filtrated. The light, yellow filtrate is cooled, stirred and acidified; M.P. 168–69° C.

C. A mixture of 5.0 g. of 4-phenyl-α-hydroxy-α-methyl-phenylacetic acid in 1.00 g. of iodine, 1.5 g. of red phosphorus and 120 cc. of acetic acid is boiled for four hours. The hot solution is filtered and poured into an equal volume of water. The pink precipitate is dissolved in acetic acid and precipitated with water. After the material has been dissolved in dilute alcohol and the solution treated with Norite, it is maintained in the form of colorless needles; M.P. 145–147° C.

Example 2.—γ-Diethylaminopropyl-4-phenyl-α-methyl-phenylacetate hydrochloride

A mixture of 3.39 g. of 4-phenyl-α-methyl-phenylacetic acid, in 2.05 g. of diethylaminopropyl chloride and 75 cc. of dry isopropyl alcohol is refluxed for 12 hours, the solvent removed under reduced pressure, the residue washed with dry ether and recrystallized from a mixture of dry ether and absolute alcohol; M.P. 112–114° C.

In a similar manner, the γ-piperidinopropyl ester is prepared; M.P. 142–144° C.; and the β-piperidinoethyl ester; M.P. 162–164° C.

Example 3.—β-Diethylaminoethyl-4-phenyl-α-methyl-phenylacetate hydrochloride

Six grams of 4-phenyl-α-methyl-phenylacetic acid and 8 cc. of thionyl chloride is refluxed for one hour and the excess thionyl chloride removed under reduced pressure; 40 cc. of dry benzene was added, the benzene distilled and the process repeated several times in order to remove all traces of thionyl chloride. The acid chloride crystallizes when cooled and melts at 99–101° after recrystallization from petroleum ether (90–100°).

A solution, prepared from 2.6 g. (0.0085) mole of 4-phenyl-α-methyl-phenylacetyl chloride and 30 cc. of dry benzene, was added slowly, with agitation, to a solution of 6.0 g. (0.0510 mole) of β-diethylaminoethyl alcohol in 10 cc. of benzene. The mixture is refluxed for one-half hour on a steam bath, cooled and the precipitated β-diethylaminoethyl alcohol hydrochloride is removed by filtration; after it has been washed with benzene and ether it weighs 1.3 g. and melts at 133–135°. The filtrate is shaken thoroughly with water, the benzene layer separated, dried with magnesium sulfate and then mixed with twice its volume of dry ether. Hydrogen chloride is passed into the solution whereupon a gummy precipitate separates; the latter turns into a colorless powder when rubbed. After recrystallization from a mixture of alcohol and ether, there is obtained 2.3 g. (64%) of colorless needles.

Example 4.—Ethyl-4-phenyl-α-methyl-phenylacetate

A solution of 0.05 mole of 4-phenyl-α-methyl-phenyl acetic acid and 0.05 mole of ethyl alcohol in 200 ml. tetrahydrofuran containing 0.1 mole of hydrogen chloride is refluxed for 5 hours and the desired ethyl ester is distilled off and purified.

In a similar manner, the ethyl propyl, ethoxyethyl, tetrahydrofurfuryl, phenyl, benzyl esters are obtained.

Example 5.—Sodium salt of 4-phenyl-α-methyl-phenylacetic acid 0.05 mole of 4-phenyl-α-methyl-phenylacetic acid in 100 cc. of ethanol is neutralized with an equivalent amount of sodium hydroxide and the sodium salt is obtained from the mixture by evaporation of the solvent or by precipitation with a miscible organic solvent such as ether. The above procedure is followed to produce the barium, calcium and aluminum salts.

Example 6.—4-phenyl-α-methyl-phenylacetamide

To a solution of 0.05 mole of the acid chloride of 4-phenyl-α-methyl-phenylacetic acid as prepared above in Example 3A in 50 ml. of 1,2-dimethoxyethane with ice-cooling is added 0.1 mole of ammonia. The mixture is stirred at 0° C. for one-half hour, poured into water and extracted with ether, dried over sodium sulfate and the product purified by crystallization.

Following the procedure above and using the following amines in place of ammonia: methylamine, ethylamine, propylamine, butylamine, diethylamine, methylethylamine, methylbutylamine, dibutylamine, ethanolamine, diethanolamine, glucosamine, glucosylamine, morpholine, N-methyl-piperazine, piperazine, N-phenylpiperazine, piperidine, benzylamine, aniline, p-ethoxyaniline, cyclohexylamine, pyrrolidine, N-hydroxyethylpiperazine, carbobenzyloxymethylamine and the like, there is obtained the corresponding amides.

Example 7.—4-phenyl-α-methyl-phenylacetic acid anhydride 0.02 mole in 100 ml. tetrahydrofuran with 0.01 mole of dicyclohexylcarbodiimide is stirred for 2 hours at room temperature; the dicyclohexylurea is filtered off, and the solution is concentrated in vacuo and purified by dissolving in ether, washing with $NaHCO_3$, then water and drying over sodium sulfate, and evaporating to produce the desired product.

The following examples will describe typical pharmaceutical formulations utilizing the active compounds of the present invention.

Example 8 (tablets)

Ingredients: Amount, mg.
4-phenyl-α-methyl-phenylacetic acid _____ 50
Lactose _____ 200
Magnesium Stearate _____ 2.5
Dicalcium Phosphate.
Starch (to granulate).

The above ingredients are thoroughly mixed and the granulation is compressed into tablets.

One tablet is administered orally three times a day.

Example 9 (oral suspension)

Ingredients: Amount
Ethyl-4-phenyl-α-methyl-phenylacetate
mg./ml__ 100
Tragacanth, percent soltuion _____ 1

Example 10 (injectable)

Ingredients:
4-phenyl-α-methyl-phenylacetamide _____mg__ 10
NaOH _____ Equivalent
Water _____ml__ 1
Benzyl alcohol, percent _____ 1

Example 11 (topical)

Ingredients:
4-phenyl-α-methyl-phenylacetic acid anhydride
mg__ 25
Hydrophillic ointment USP _____g__ 1

Example 12 (capsule)

Ingredients:
Sodium-4-phenyl - α - methyl-phenylacetic acid
(90% less than 10 microns)_____mg__ 50
Lactose _____mg__ 200
No. 1 Gelatin capsule.

Example 13 (suppository)

Ingredients:
β-diethylaminoethyl-4-phenyl-α-methyl phenylacetate _____mg__ 100
Cocoa butter _____g__ 2

Example 14

Ingredients:
4-phenyl-α-methyl-phenylacetic acid _____mg__ 200
Freon "22" propellant (percent solution)_____ 1

Example 15.—Resolution of 4-phenyl-α-methyl-phenylacetic acid

A mixture of 0.1 mole of 4-phenyl-α-methyl-phenylacetic acid and 0.1 mole of 1-α-phenethylamine is dissolved in 500 ml. of a hot 4:1 benzene-ethanol mixture. On cooling, the resulting salt is filtered off. This is then fractionally crystallized from a benzene-ethanol mixture to constant optical activity. The free acid is obtained from the purified salt by acidification with dilute hydrochloric acid. The diastereomeric salt is recovered from the original mother liquor by concentration in vacuo. It is again fractionally crystallized from benzene-ethanol to constant optical activity and acidified to give the enantiomorphic free acid.

Similarly, the resolution is carried out with 1-α-phenethylamine to give the enantiomorphs.

When the d-enantiomorph is used in the procedures of Examples 2, 3, 4, 5, 6 and 7, the corresponding esters, amides and anhydrides of the d-acid are obtained. When these are used in half quantities in the formulations of Examples 8, 9, 10, 11, 12, 13 and 14, similar preparations are obtained.

What is claimed is:

1. A method of treating inflammation which comprises administering to a patient suffering from inflammation between 1–2,000 mg. per day of dl-4-phenyl-α-methyl-phenyl acetic acid to produce thereby a reduction of the degree of inflammation of said patient.

2. A method according to claim 1 wherein the compound to be administered is d-4-phenyl-α-methyl-phenyl acetic acid.

3. A method of treating inflammation which comprises administering to a patient suffering from inflammation between 1–2,000 mg. per day of a compound having the formula:

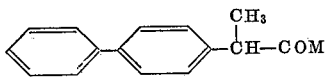

wherein M is lower alkoxy to produce thereby a reduction of the degree of inflammation of said patient.

4. The method in accordance with claim 3 wherein the compound to be administered is ethyl-4-phenyl-α-methyl-phenyl acetate.

5. A method of treating inflammation which comprises administering to a patient suffering from inflammation between 1–2,000 mg. per day of a compound having the formula:

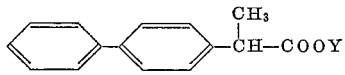

wherein Y is an alkaline earth metal, an alkali metal, aluminum or magnesium to produce thereby a reduction of the degree of inflammation of said patient.

6. The method in accordance with claim 5 wherein the compound to be administered is sodium-4-phenyl-α-methyl-phenyl acetate.

7. A method of treating inflammation which comprises administering to a patient suffering from inflammation between 1–2,000 mg. per day of dimethylaminoethyl-4-phenyl-α-methyl-phenyl acetate to produce thereby a reduction of the degree of inflammation of said patient.

8. A method of treating inflammation which comprises administering to a patient suffering from inflammation between 1–2,000 mg. per day of benzyl-4-phenyl-α-methyl-phenyl acetate to produce thereby a reduction of the degree of inflammation of said patient.

9. A method of treating inflammation which comprises administering to a patient suffering from inflammation between 1–2,000 mg. per day of diethylaminoethyl-4-phenyl-α-methyl-phenyl acetate to produce thereby a reduction of the degree of inflammation of said patient.

10. A method of treating inflammation which comprises administering to a patient suffering from inflammation between 1–2,000 mg. per day of 4-phenyl-α-methyl-phenyl acetamide to produce thereby a reduction of the degree of inflammation of said patient.

11. A method of treating inflammation which comprises administering to a patient suffering from inflammation between 1–2,000 mg. per day of 4-phenyl-α-methyl-phenyl acetmorpholide to produce thereby a reduction of the degree of inflammation of said patient.

12. A method of treating inflammation which comprises administering to a patient suffering from inflammation between 1–2,000 mg. per day of ethoxy ethyl-4-phenyl-α-methyl-phenyl acetate to produce thereby a reduction of the degree of inflammation of said patient.

13. A method of treating inflammation which comprises administering to a patient suffering from inflammation between 1–2,000 mg. per day of 4-phenyl-α-methyl-phenyl acet-D-glucosamide to produce thereby a reduction of the degree of inflammation of said patient.

No references cited.

ALBERT T. MEYERS, Primary Examiner

STANLEY J. FRIEDMAN, Assistant Examiner

U.S. Cl. X.R.

424—180, 250, 267, 285, 308, 317, 324